United States Patent
Kuzemchak et al.

(10) Patent No.: US 6,543,048 B1
(45) Date of Patent: Apr. 1, 2003

(54) DEBUGGER WITH REAL-TIME DATA EXCHANGE

(75) Inventors: Edward Kuzemchak, Avonmore, PA (US); Deborah Keil, Pittsburgh, PA (US); Leland Szewerenko, Pittsburgh, PA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/578,516

(22) Filed: May 26, 2000

Related U.S. Application Data

(63) Continuation of application No. 09/432,646, filed on Nov. 2, 1999, now abandoned.
(60) Provisional application No. 60/106,572, filed on Nov. 2, 1998.

(51) Int. Cl.$^7$ .................................................. G06F 9/44
(52) U.S. Cl. .................... 717/127; 717/128; 714/27; 714/30; 714/39
(58) Field of Search ................... 717/124, 127, 717/128, 129; 714/25, 27, 28, 30, 34, 39; 702/117, 183, 186; 703/28, 26

(56) References Cited

U.S. PATENT DOCUMENTS

| | | | | |
|---|---|---|---|---|
| 5,228,039 A | * | 7/1993 | Knoke et al. | 714/28 |
| 5,479,652 A | * | 12/1995 | Dreyer et al. | 714/30 |
| 5,488,688 A | * | 1/1996 | Gonzales et al. | 714/34 |
| 5,590,354 A | * | 12/1996 | Klapproth et al. | 714/30 |
| 5,768,152 A | * | 6/1998 | Battaline et al. | 702/186 |
| 5,771,240 A | * | 6/1998 | Tobin et al. | 714/724 |
| 5,828,824 A | * | 10/1998 | Swoboda | 714/25 |
| 5,884,023 A | * | 3/1999 | Swoboda et al. | 714/30 |
| 5,968,188 A | * | 10/1999 | Rana | 714/29 |
| 6,041,406 A | * | 3/2000 | Mann | 712/227 |
| 6,185,732 B1 | * | 2/2001 | Mann et al. | 717/4 |
| 6,249,909 B1 | * | 6/2001 | Russo et al. | 717/9 |
| 6,311,292 B1 | * | 10/2001 | Choquette et al. | 714/30 |

* cited by examiner

Primary Examiner—Tuan Q. Dam
(74) Attorney, Agent, or Firm—Robert L. Troike; Frederick J. Telecky, Jr.

(57) ABSTRACT

A collection of program instructions capable of executing on a host processor suitable for reading from a memory location of a target processor and suitable for creating a real-time data channel between said host and target processors.

18 Claims, 1 Drawing Sheet

DEBUGGER WITH REAL-TIME DATA EXCHANGE

This is a continuation of application Ser. No. 09/432,646, filed Nov. 2, 1999, now abandoned.

This application claims priority under 35 USC §119(e)(1) of Provisional Application Ser. No. 60/106,572, filed Nov. 2, 1998.

TECHNICAL FIELD OF THE INVENTION

This invention relates generally to real-time data exchange, and more particularly to a debugger with real-time data exchange.

BACKGROUND OF INVENTION

In the past, DSP application designers have gathered data by stopping a target application at designated breakpoints to read registers and other data storage locations. This practice is not only cumbersome, it can provide misleading data because it yields only a snapshot obtained by suddenly stopping a high-speed application—a readout that may not present an accurate view of the system's continuous operation.

The best analysis techniques for DSP systems are similar to those for medical diagnosis in that they require accurate, real-world information for proper results. For example, doctors put cardiac patients through stress tests that continuously monitor vital signs in changing conditions rather than record information only at intervals. This method provides real-time diagnostics: a stress test carefully analyzes patient health by monitoring changes and their causes as they occur in the body.

SUMMARY OF THE INVENTION

The present invention provides a digital signal processing (DSP) analysis technology called Real-Time Data Exchange (RTDX™). RTDX offers developers continuous bi-directional data exchange in real time with minimal perturbation on the application. RTDX uses a JTAG data path and debugger, it can be supported on many different processors without assuming any particular I/O peripherals and can also use other data interfaces instead of or in addition to JTAG.

RTDX displays data using an OLE-enabled visualization package, is easy to program on both target and host, and is provided at no additional cost, bringing substantial value to DSP solutions.

RTDX enables developers to transmit and receive data between a host computer and a target system without stopping their applications. Output data can be directed to customized and third party visualization tools via the industry-standard object linking and embedding (OLE) application program interface (API). RTDX speeds and enhances the accuracy of DSP application debugging, saving developers time in preparing their products for the market. U.S. Pat. No. 5,884,023 depicts hardware and portions of software to implement RTDX and is incorporated herein by reference.

RTDX capability enables easy analysis for many current and emerging DSP systems. Wireless telecommunication designers can capture the output of their vocoder algorithms to check the implementations of speech applications.

Embedded control systems also benefit. For example, hard disk drive applications can be tested without improper signals to the servomotor crashing the drive. Engine control designers can analyze changing conditions such as heat and environmental conditions while the control application is running. In all uses of RTDX, designers can view performance through the most meaningful visualization tools for these applications.

A debugger, comprising of a collection of program instructions capable of executing on a host processor suitable for reading from a memory location of a target processor and suitable for. creating a real-time data channel between said host and target processors.

DETAILED DESCRIPTION

The last two letters of the acronym RTDX stand for "Data Exchange"—precisely what the present invention provides. Data can be sent from the target to the host and from the host to the target.

Baseline support for data exchange is supplied by the emulation logic included on most microprocessors, especially digital signal processors, so data can be transferred using the same simple JTAG debug connection used for all other debug/control operations. This fact means RTDX can be supported on most processors without assuming any particular I/O peripherals. However, RTDX technology can also take advantage of other data interfaces either instead of or in addition to JTAG. Customers are free to use data paths that provide higher bandwidths or more communication security in end-user products.

In addition to providing a universal connection, the JTAG interface and emulation logic also serve to minimize the intrusiveness of the RTDX capability. Advanced emulation allows data to be transferred to the host as a background activity with minimal perturbation of the processor. In processors with advanced emulation, each data word is transferred directly from memory. The hardware may borrow a processor cycle for each word or do direct memory access depending on the processor implementation.

Target to Host

Figure 1:
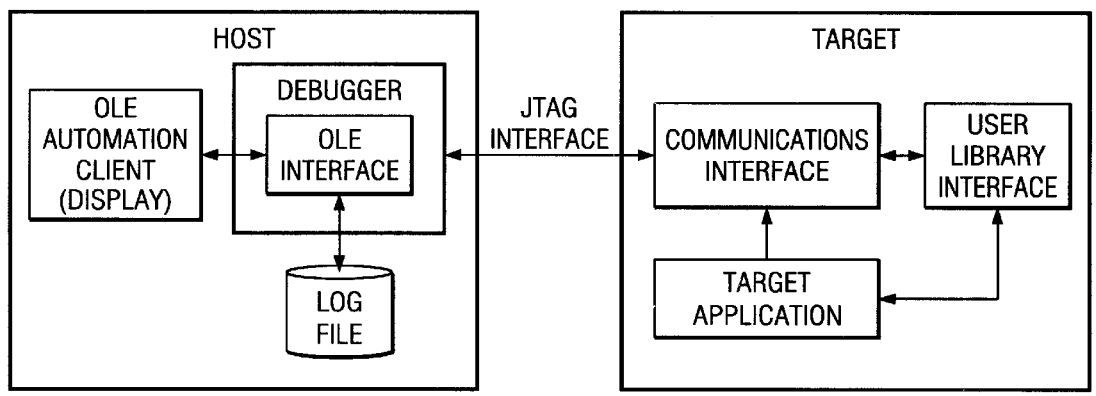
FIG. 1 depicts the interconnection between a host processor employing the debugger of the present invention and a target processor.
Figure 2:
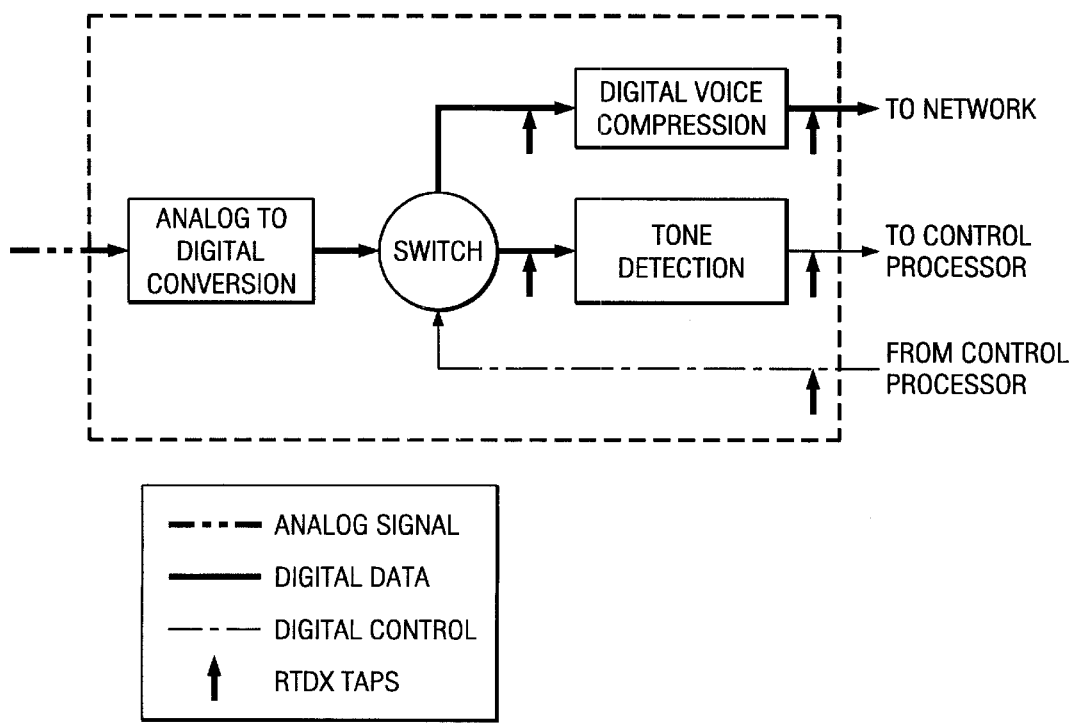
FIG. 2 depicts a representative application program executing on a target processor configured to employ portions of the present invention.

The debugger controls the flow of data between the host and target (see FIG. 1). Data flows from the target application through the User Library Interface and the Communications Interface to the debugger running on the host. The target application calls routines in the User Library Interface that buffer the data and pass it to the Communications Interface. This in turn sends the data to the debugger by way of a JTAG interface. The debugger records the data in a log file on the host.

On the host, the debugger supports OLE automation. Any host application that is an OLE Automation client (those written in Visual Basic or Visual C++, for example) can access data in an RTDX log file or send data to the target via the OLE interface.

Host to Target

Data flows from the OLE Automation Client to the debugger. The debugger buffers the data on the host. When the debugger receives a read request from the target application, the data is sent to the Communications Interface on the target via a JTAG interface. The Communications Interface passes the data to the User Library Interface, which then delivers it to the target application.

Putting RTDX into Action

A simple example illustrates the ease of using RTDX. A target application will use RTDX to send 100 consecutive integers to the host. The data will be displayed in a Microsoft Excel spreadsheet.

Preparing the Target Application

Normally, RTDX User Library Interface calls are inserted into a working target application. The target application in this example is a loop that generates an array of data. RTDX calls were inserted to open and enable an output channel and log the generated data to that channel. RTDX sends the data to the host where it is recorded in a log file. The C code on the target is shown in Table 1 below. The RTDX commands are shown in boldface type.

In a real application, RTDX_Data_Write would be called to log data at the rate at which the real-time application generated it. This toy example generates data at an extremely high rate limited only by CPU speed. In the example, we are using the return value of RTDX_Data_Write to determine if the data was successfully logged. The surrounding while loop does a busy wait until the data can be accepted. The data rate in a real application would be determined by the function it performed; the while loop would not be used.

TABLE 1

Target Application Code Written in C

```c
/************************************************************
 * - Transmits 100 integers, 10 at a time.
 * - Shows Data transmission from target to host.
 ************************************************************/
#include <RTDX_usr.h>                    /* RTDX User Library Interface  */
#include <stdio.h>                       /* printf                        */
#define DATA_MEMBERS 10                  /* number of elements in array   */
RTDX_output_channel ochan;               /* globally declare RTDX channel */
static void Generate_Application_Data( int *dp );
void main( void )
{
    int data[DATA_MEMBERS];              /* data to send to host          */
    int i;
    RTDX_Enable_Data_Output(&ochan);
    for (i = 0; i < 10; i += 1)          /* for 10 messages...            */
    {
        Generate_Application_Data(data); /* generate data                 */
        while (                          /* limit TOY EXAMPLE data rate  */
            !RTDX_Data_Write( &ochan, data, sizeof(data) ) /* send data   */
        );
    }
    RTDX_Disable_Data_Output(&ochan);
    printf("\n\nTest Completed");
} /* main */
/* Our toy application generates arrays of integers.                      */
static void Generate_Application_Data( int dp[] )
{
    int i;
    static int j = 1;
    for (i = 0; i < DATA_MEMBERS; i++)   /* for RTDX message size...      */
        dp[i] = j++;                     /* fill array with data          */
}
```

Preparing the Host Application

Host-side RTDX declarations and calls to the OLE Interface can be inserted to obtain the data from the target. Refer to the Microsoft Excel Visual Basic code in Table 2 below. This code is executed within an Excel Workspace. The RTDX commands are again shown in boldface type.

TABLE 2

Visual Basic Module Executed Within an Excel Workspace on the Host

```
###########################################################################
' Copyright (c) 1997 Texas Instruments Incorporated
' A module to read data from a single channel into an Excel spreadsheet
' that is automatically cleared & updated with new data.
###########################################################################
' RTDX OLE API Status Return codes
Const SUCCESS = &h0
Const FAIL = &h80004005
Const ENoDataAvailable = &h8003001e
Const EEndOfLogFile = &h80030002
Const members = 10                       ' Total number of integers in array
Option Explicit
```

TABLE 2-continued

Visual Basic Module Executed Within an Excel Workspace on the Host

```
Sub read_channel ()
    Dim rtdx As Object                              ' object variable
    Dim row, col As Integer                         ' temporary worksheet indices
    Dim status As Long                              ' variable for status of RTDX read
    Dim data As Long                                ' variable for data from RTDX read
    Worksheets("Data").Range("A1:IV16384").Clear   ' Clear old data
    Set rtdx = GetObject("", "Debugger.RTDX")       ' Get Debugger class object
                                   ' variable RTDX becomes an instantiation of the OLE interface
    status = rtdx.Open("ochan", "R") ' Open channel with name "ochan" for reading
    row = 1                                         ' Start data display here
    col = 1
    Do
        status = rtdx.ReadI4(data)                  ' Read value from data channel
        Select Case status
            Case Is = SUCCESS                       ' if ReadI4 was successful...
                Worksheets ("Data").Cells (row, col) =
                    data                            ' Copy data read into spreadsheet
                col = col + 1
                If (col > members) Then             ' if reading next column of data...
                    row = row + 1                   ' move to next row
                    col = 1                         ' column 1
                End If
            Case Is = FAIL                          ' if ReadI4 failed...
                MsgBox ("Error reading data")
                Exit Do
            Case Is = ENoDataAvailable              ' if data not yet available...
                MsgBox ("Data not Available")
            Case Is = EEndOfLogFile                 ' if end of data reached...
                MsgBox ("End of Log reached")
                Exit Do
            Case Else
                MsgBox ("Unknown return code")      ' trap invalid return codes...
                Exit Do
        End Select
    Loop Until status = EEndOfLogFile
    status = rtdx.Close()                           ' Close channel
End Sub
```

Obtaining the Data

Once the target application and host applications are prepared, they must be executed. Using the debugger, the target application is loaded onto the DSP and run. The data passed into RTDX_Data_Write is buffered and passed on to the Communications Interface. A scan-based emulator built into the IDSP core moves the data from the DSP to the host via a JTAG interface (serial test bus). On the host, the debugger records the data it receives in a log file. This entire operation is done in real time.

The host application must also be executed to obtain the data from the log file. The host application can be executed simultaneously with the target application or at a later time. If executed simultaneously, the data is delivered to the host application as it becomes available. If executed after the target application, the data is immediately available from the log file.

If the debugger is not currently running and the host application is executed on an existing log file, the TI debugger will be invoked by the host application as an OLE Automation Server. The debugger is the agent that allows the data to be obtained.

Displaying the Data

The compatibility of RTDX with industry-standard APIs benefits DSP system developers by allowing them to choose the most appropriate visualization tool and focus their attention on debugging systems rather than obtaining data. Data in the log can be accessed by any host application that is an OLE Automation client.

Commercially available application development software packages include Microsoft Excel, National Instruments' LabVIEW and Quinn-Curtis' Real-Time Graphics Tools. Alternatively, the host application can be written in Visual Basic or Visual C++. Visual Basic may be used within -Microsoft Excel, as is done in this example. The result is shown in Table 3, below.

TABLE 3

Data Displayed in Microsoft Excel

| 1  | 2  | 3  | 4  | 5  | 6  | 7  | 8  | 9  | 10  |
|----|----|----|----|----|----|----|----|----|-----|
| 11 | 12 | 13 | 14 | 15 | 16 | 17 | 18 | 19 | 20  |
| 21 | 22 | 23 | 24 | 25 | 26 | 27 | 28 | 29 | 30  |
| 31 | 32 | 33 | 34 | 35 | 36 | 37 | 38 | 39 | 40  |
| 41 | 42 | 43 | 44 | 45 | 46 | 47 | 48 | 49 | 50  |
| 51 | 52 | 53 | 54 | 55 | 56 | 57 | 58 | 59 | 60  |
| 61 | 62 | 63 | 64 | 65 | 66 | 67 | 68 | 69 | 70  |
| 71 | 72 | 73 | 74 | 75 | 76 | 77 | 78 | 79 | 80  |
| 81 | 82 | 83 | 84 | 85 | 86 | 87 | 88 | 89 | 90  |
| 91 | 92 | 93 | 94 | 95 | 96 | 97 | 98 | 99 | 100 |

The ability to continuously monitor the performance of DSP applications—as though viewing a dashboard on a car will significantly save time for third party developers and end users.

To review its key benefits, RTDX:

Provides continuous bi-directional data exchange without halting an application

Functions in real time with minimal perturbation on the application

Uses universal JTAG data path and debugger

Displays data using your favorite OLE-enabled visualization package

Is easy to program on both target and host

What is claimed is:

1. A method for exchanging data between a host application on a host processor and a target application on a target processor comprising the steps of:

providing a debugger on said host processor with said debugger providing a host data transfer user interface usable by a host client application and another transfer user interface usable by a target application and transferring said data bidirectionally between said host application on said host processor and said target application on said target processor by use of a transfer mechanism including a JTAG debug link; said transferring step transferring said data bidirectionally by said JTAG link concurrent with the execution of the host and target applications.

2. The method of claim 1 wherein said transferring step includes a client transferring step of transferring data said debugger and a client.

3. The method of claim 2 wherein said host data transfer user interface is a COM or OLE interface and said client transferring step includes transferring said data via said debugger functioning as a COM or OLE server on the host processor.

4. The data exchange of claim 1 wherein said target processor is a digital signal processor having at least one software application embedded in said digital signal processor.

5. The method of claim 1 including the step of said debugger buffering data transferred from a host application to the target application.

6. The method of claim 1 including the step of said debugger retaining said data until a request for said data is transferred from said target.

7. The method of claim 6 wherein said request is initiated via said target user interface by said target application.

8. The method of claim 7 wherein said request is transferred via the transfer mechanism.

9. The method of claim 8 including the step matching said request to the buffered data from the host application whereupon the matched data is transferred to said target.

10. The method of claim 1 including the step of said target application declaring host to target and target to host channels on which data may be transferred.

11. The method of claim 1 including the step of either said target application or the host application enabling or disabling channels for the purpose of controlling the flow of data.

12. The method of claim 1 including the step of said debugger recording the data for later use.

13. The method of claim 12 including the step of processing the recorded data by the host application using the same host user interface as is used for real-time data.

14. The method of claim 1 including the step of buffering the data being transferred from said target to said host.

15. A method for exchanging data between a host application on a host processor and a target application on a target processor comprising the steps of:

opening a channel between said target application on a target processor and said host application on said host processor;

sending a request to said debugger on said host processor via said channel;

receiving data at said debugger from a client application executing on said host processor;

matching said data from said client to said request; and storing said data from said host application on said host processor into a target memory of said target processor.

16. The method of claim 15 wherein said matching step includes receiving said data such that said debugger matches said data to said request.

17. The method of claim 16 wherein said receiving step includes receiving said data from a client coupled to said host processor.

18. The method of claim 15 wherein said client is a COM or OLE client.

* * * * *